(12) United States Patent
Chen

(10) Patent No.: US 10,477,166 B2
(45) Date of Patent: Nov. 12, 2019

(54) WAVELENGTH CONVERSION DEVICE AND PROJECTOR

(71) Applicant: Coretronic Corporation, Hsin-Chu (TW)

(72) Inventor: I-Hua Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/278,028

(22) Filed: Sep. 28, 2016

(65) Prior Publication Data

US 2017/0180686 A1     Jun. 22, 2017

(30) Foreign Application Priority Data

Dec. 18, 2015  (TW) .............................. 104142607 A

(51) Int. Cl.
*H04N 9/31* (2006.01)
*G02B 26/00* (2006.01)
(Continued)

(52) U.S. Cl.
CPC ......... *H04N 9/3114* (2013.01); *G02B 26/008* (2013.01); *G03B 21/16* (2013.01); *G03B 21/204* (2013.01)

(58) Field of Classification Search
CPC ............................ G02B 26/008; G03B 21/204
See application file for complete search history.

(56) References Cited

U.S. PATENT DOCUMENTS

2006/0245093 A1* 11/2006 Kao ..................... G02B 26/008
                                                              359/892
2008/0055558 A1    3/2008 Tang et al.
(Continued)

FOREIGN PATENT DOCUMENTS

| CN | 101539270 | 6/2011 |
|---|---|---|
| CN | 103534824 | 1/2014 |

(Continued)

OTHER PUBLICATIONS

"Notice of Office Allowance of Japan Counterpart Application," dated Jan. 9, 2018, p. 1-p. 3, in which the listed reference was cited.

(Continued)

*Primary Examiner* — Cara E Rakowski
*Assistant Examiner* — Christopher A Lamb, II
(74) *Attorney, Agent, or Firm* — JCIPRNET

(57) ABSTRACT

A wavelength conversion device includes a main body, a first reflective layer, a second reflective layer, a first wavelength conversion layer and a second wavelength conversion layer. The main body has at least two sections. The first and second reflective layers are disposed on the main body and aligned to the sections respectively. Materials of the first and second reflective layers are different. The first and second wavelength conversion layers are disposed on the main body and aligned to the first and second reflective layers respectively. The first wavelength conversion layer is adapted to convert an excitation light beam into a first excited light beam having a first wavelength. The second wavelength conversion layer is adapted to convert the excitation light beam into a second excited light beam having a second wavelength. The first and second wavelengths are different. Besides, a projector using the wavelength conversion device is provided.

16 Claims, 6 Drawing Sheets

(51) Int. Cl.
  *G03B 21/16* (2006.01)
  *G03B 21/20* (2006.01)

(56) References Cited

U.S. PATENT DOCUMENTS

| | | | | |
|---|---|---|---|---|
| 2012/0242912 A1* | 9/2012 | Kitano | ............... | H04N 9/3111 348/759 |
| 2014/0043829 A1* | 2/2014 | Wu | ............... | G02B 26/008 362/324 |
| 2015/0002824 A1* | 1/2015 | Kasugai | ............... | G03B 21/204 353/31 |
| 2015/0098065 A1* | 4/2015 | Tanaka | ............... | G03B 21/2013 353/84 |
| 2015/0219870 A1* | 8/2015 | Adema | ............... | G02B 7/006 359/892 |
| 2016/0252722 A1* | 9/2016 | Li | ............... | F21V 9/16 362/84 |

FOREIGN PATENT DOCUMENTS

| | | |
|---|---|---|
| CN | 203810292 | 9/2014 |
| CN | 104238248 | 12/2014 |
| CN | 104566230 | 4/2015 |
| CN | 104595852 | 5/2015 |
| CN | 104676491 | 6/2015 |
| CN | 204420882 | 6/2015 |
| JP | 2008065326 | 3/2008 |
| JP | 2010225373 | 10/2010 |
| JP | 2012177934 | 9/2012 |
| JP | 2012212129 | 11/2012 |
| JP | 2013024558 | 2/2013 |
| JP | 2014142369 | 8/2014 |
| JP | 2015087750 | 5/2015 |
| JP | 2015092224 | 5/2015 |
| JP | 2015143824 | 8/2015 |
| TW | 201546534 | 12/2015 |

OTHER PUBLICATIONS

"Notice of Office Allowance of Taiwan Counterpart Application," dated Jan. 9, 2018, p. 1-p. 3, in which the listed reference was cited.
"Office Action of China Counterpart Application," dated Apr. 28, 2018, p. 1-p. 9, in which the listed references were cited.

* cited by examiner

WAVELENGTH CONVERSION DEVICE AND PROJECTOR

CROSS-REFERENCE TO RELATED APPLICATION

This application claims the priority benefit of Taiwan application serial no. 104142607, filed on Dec. 18, 2015. The entirety of the above-mentioned patent application is hereby incorporated by reference herein and made a part of this specification.

BACKGROUND OF THE INVENTION

Field of the Invention

The invention relates to an optical device and a projector, and particularly relates to a wavelength conversion device and a projector using the same.

Description of Related Art

In recent years, projectors using a solid-state light source such as light-emitting diodes (LED) and laser diodes, etc., gradually occupy a place in the market. Light-emitting efficiency of the laser diode is about 20% higher than that of the LED. In order to break through a light source limitation of the LED, a pure color light source required by the projectors that is produced by exciting a phosphor powder by a laser light source is gradually developed. Moreover, a laser projector uses a laser light beam provided by the laser diode to excite the phosphor powder to emit light to serve as an illumination light source of the projector, so as to achieve various brightness requirements of the projector. Therefore, the projectors adopting a laser light source device to serve as an illumination system have a great potential to replace the conventional high pressure mercury lamp to become the light source used in the new generation mainstream projectors.

In a current laser projector, a reflective layer is generally formed on a metal substrate through a film coating manner. A phosphor layer is coated on the reflective layer to construct a phosphor wheel, and then the laser light beam emitted by the laser light source device excites the phosphor layer of the phosphor wheel on the metal substrate to produce light beams in different colors (for example, a green light beam and a yellow light beam). The laser light beam (for example, a blue light) may directly pass through a hollow slot or a transparent diffusion plate on the metal substrate of the phosphor wheel to combine with the excited light beams for producing light beams in various colors. However, the reflective layer generally has a same coating design and cannot achieve a high reflectance for all kinds of color light beams, and in order to make the reflective layer to be adapted to reflect different color light beams, multi-layer coating has to be adopted, which increases a manufacturing cost. Moreover, flatness and a coating matching ability of the metal substrate are relatively poor, which results in a fact that the reflectance of the reflective layer is hard to be increased.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention is directed to a wavelength conversion device, which has a high reflectance for different color light beams, and has a low manufacturing cost.

The invention is directed to a projector, in which a wavelength conversion device has a high reflectance for different color light beams, and has a low manufacturing cost.

Other objects and advantages of the invention can be further illustrated by the technical features broadly embodied and described as follows.

In order to achieve one or a portion of or all of the objects or other objects, an embodiment of the invention provides a wavelength conversion device adapted to convert a wavelength of an excitation light beam. The wavelength conversion device includes a main body, a first reflective layer, a second reflective layer, a first wavelength conversion layer and a second wavelength conversion layer. The main body has at least two sections. The first reflective layer is disposed on the main body and is aligned to one of the sections. The second reflective layer is disposed on the main body and is aligned to another one of the sections, where materials of the first and second reflective layers are different. The first wavelength conversion layer is disposed on the main body and is aligned to the first reflective layer, and the first wavelength conversion layer is adapted to convert the excitation light beam into a first excited light beam having a first wavelength. The second wavelength conversion layer is disposed on the main body and is aligned to the second reflective layer, and the second wavelength conversion layer is adapted to convert the excitation light beam into a second excited light beam having a second wavelength, where the first wavelength and the second wavelength are different.

In order to achieve one or a portion of or all of the objects or other objects, an embodiment of the invention provides a projector including an excitation light source device, a wavelength conversion device, a light valve and a projection lens. The excitation light source device is adapted to provide an excitation light beam. The wavelength conversion device is adapted to convert a wavelength of the excitation light beam, where the wavelength conversion device includes a main body, a first reflective layer, a second reflective layer, a first wavelength conversion layer and a second wavelength conversion layer. The main body has at least two sections. The first reflective layer is disposed on the main body and is aligned to one of the sections. The second reflective layer is disposed on the main body and is aligned to another one of the sections, where materials of the first and second reflective layers are different. The first wavelength conversion layer is disposed on the main body and is aligned to the first reflective layer, and the first wavelength conversion layer is adapted to convert the excitation light beam into a first excited light beam having a first wavelength. The second wavelength conversion layer is disposed on the main body and is aligned to the second reflective layer, and the second wavelength conversion layer is adapted to convert the excitation light beam into a second excited light beam having a second wavelength, where the first wavelength and the second wavelength are different. The light valve is disposed on a transmission path of the excitation light beam, and is adapted to convert the excitation light beam into an image light beam. The projection lens is located on a transmission path of the image light beam, and is adapted to convert the image light beam into a projection light beam.

According to the above descriptions, the embodiments of the invention have at least one of the following advantages or effects. In the wavelength conversion device of the invention, different sections of the main body are respectively configured with different reflective layers, and the reflectively layers are respectively aligned to different wavelength conversion layers. In this way, the reflective layers may respectively and selectively use different materials according to the corresponding wavelength conversion layers, such that the wavelength conversion device has a high reflectance for the light beams in different colors, and it is unnecessary to adopt multilayer coating to make a single reflection layer to be adapted to reflect the light beams in different colors, so as to save the manufacturing cost.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
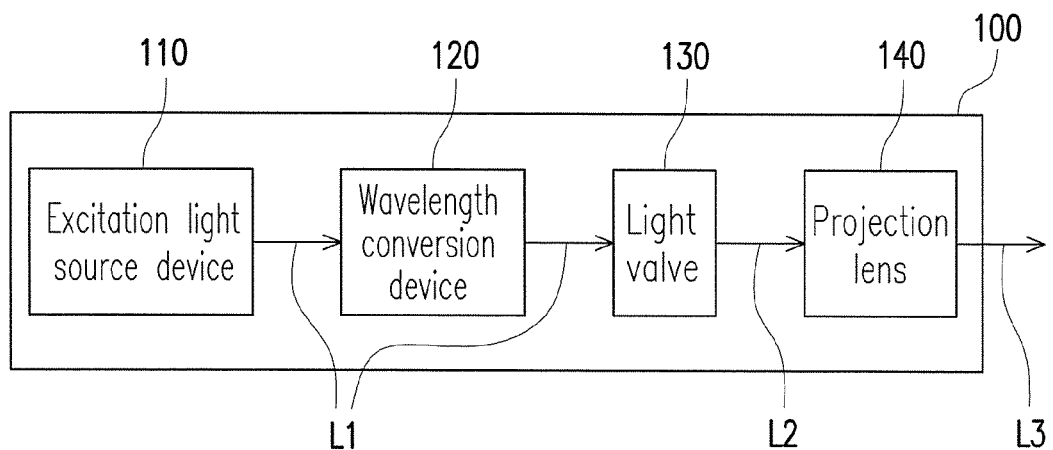
FIG. 1 is a schematic diagram of a projector according to an embodiment of the invention.

FIG. 1 is a schematic diagram of a projector according to an embodiment of the invention. Referring to FIG. 1, the projector 100 of the embodiment includes an excitation light source device 110, a wavelength conversion device 120, a light valve 130 and a projection lens 140. The excitation light source device 110 is, for example, a laser light source and is adapted to provide an excitation light beam L1. The wavelength conversion device 120 is, for example, a phosphor wheel, and wavelength conversion device 120 is located on a transmission path of the excitation light beam L1 and is adapted to convert a wavelength of the excitation light beam L1 to produce an excited light beam with a different wavelength. The light valve 130 is disposed on a transmission path of the excitation light beam L1 and the excited light beam, and is adapted to convert the excitation light beam L1 and the excited light beam into an image light beam L2. The projection lens 140 is located on a transmission path of the image light beam L2, and is adapted to convert the image light beam L2 into a projection light beam L3.

Figure 2:
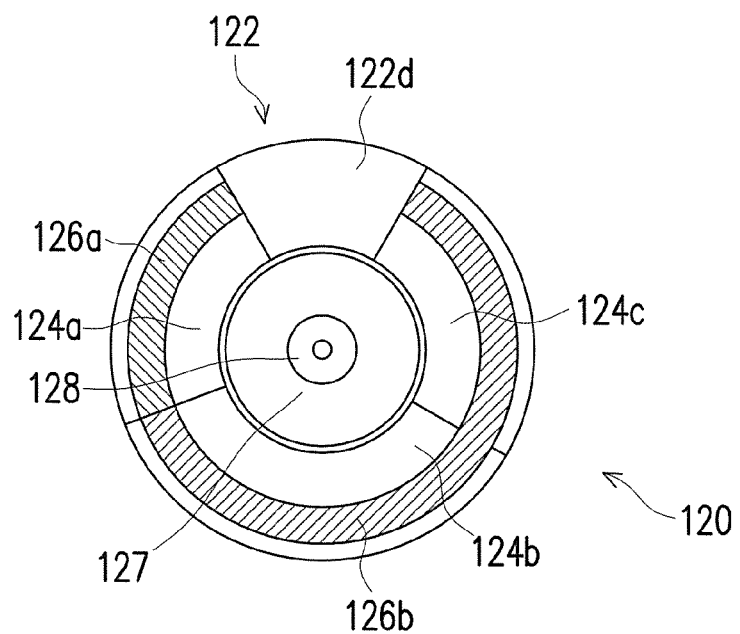
FIG. 2 is a front view of the wavelength conversion device of FIG. 1.
Figure 3:
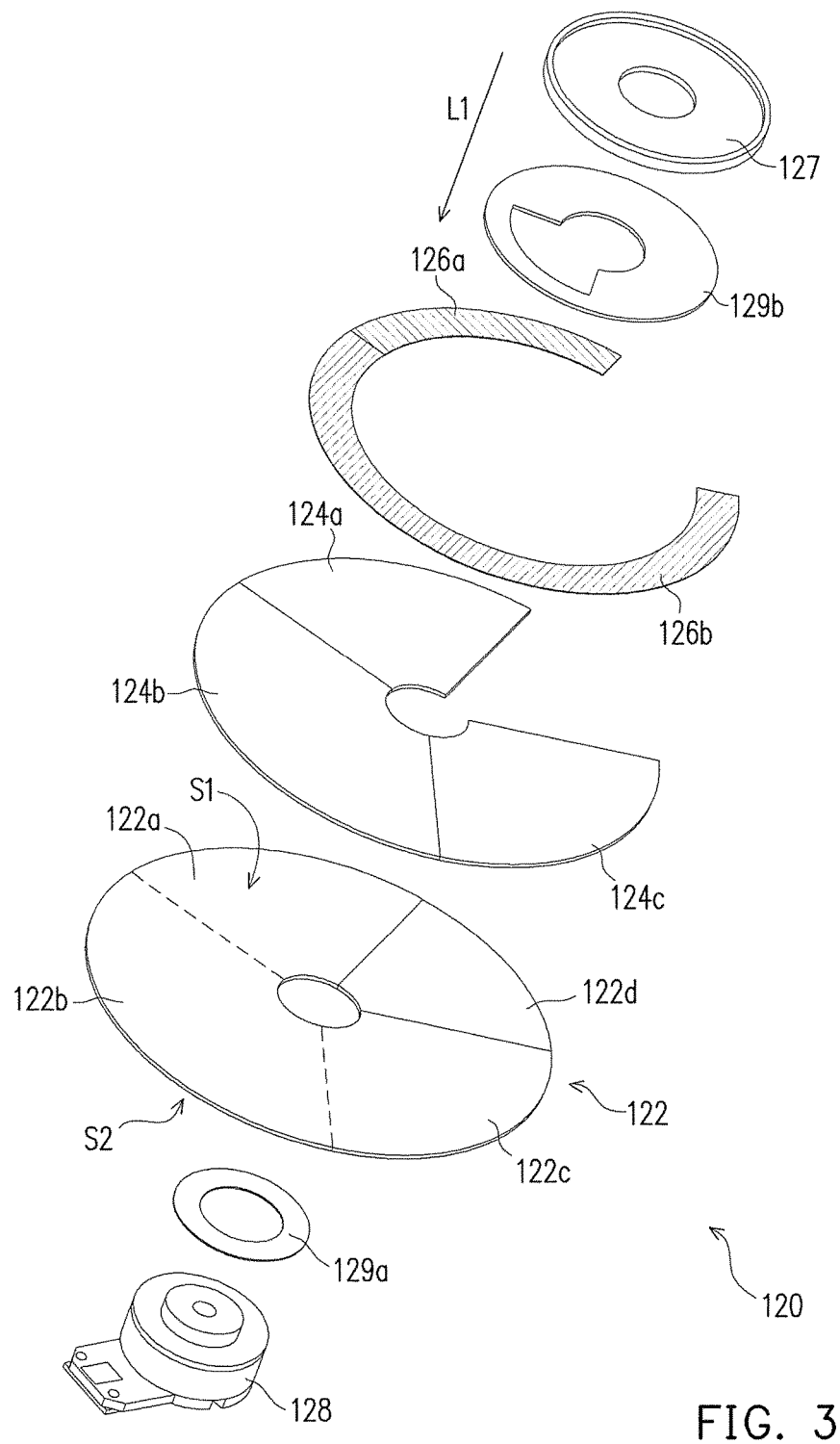
FIG. 3 is an exploded view of the wavelength conversion device of FIG. 2.

FIG. 2 is a front view of the wavelength conversion device of FIG. 1. FIG. 3 is an exploded view of the wavelength conversion device of FIG. 2. Referring to FIG. 2 and FIG. 3, the wavelength conversion device 120 of the embodiment includes a main body 122, a first reflective layer 124a, a second reflective layer 124b, a third reflective layer 124c, a first wavelength conversion layer 126a, a second wavelength conversion layer 126b and a driving unit 128. The main body 122 is, for example, a disc-like substrate and has at least two sections (three sections 122a, 122b and 122c are illustrated) and a light penetration region 122d. The light penetration region 122d is located adjacent to the sections 122a and 122c, and for example, has a light diffusion function, where a material of the light penetration region 122d can be glass coated with an antireflection layer, though the invention is not limited thereto. The first reflective layer 124a is disposed on the main body 122 and is aligned to the section 122a, the second reflective layer 124b is disposed on the main body 122 and is aligned to the section 122b, and the third reflective layer 124c is disposed on the main body 122 and is aligned to the section 122c, where materials of the first reflective layer 124a, the second reflective layer 124b and the third reflective layer 124c are different.

The first wavelength conversion layer 126a and the second wavelength conversion layer 126b are, for example, phosphor layers. The first wavelength conversion layer 126a is disposed on the main body 122 and is aligned to the first reflective layer 124a, and the second wavelength conversion layer 126b is disposed on the main body 122 and is aligned to the second reflective layer 124b and the third reflective layer 124c. The first wavelength conversion layer 126a and the second wavelength conversion layer 126b present a ring shape coaxial with the main body 122. Moreover, the first reflective layer 124a, the second reflective layer 124b and the third reflective layer 124c can be respectively coated on the corresponding sections 122a, 122b and 122c of the main body 122 in the ring shape coaxial with the main body 122. Then, the first wavelength conversion layer 126a corresponds to an area and a position of the first reflective layer 124a, and the second wavelength conversion layer 126b corresponds to areas and positions of the second reflective layer 124b and the third reflective layer 124c. In the embodiment, the reflective layers 124a, 124b and 124c are respectively coated on the entire sections 122a, 122b and 122c of the main body 122, though the invention is not limited thereto. The driving unit 128 is, for example, a motor, and is configured to drive the main body 122 to rotate. When the main body 122 rotates, the main body 122 drives the first wavelength conversion layer 126a, the second wavelength conversion layer 126b and the light penetration region 122d to sequentially move into the transmission path of the excitation light beam L1 shown in FIG. 1.

The first wavelength conversion layer 126a is adapted to convert the excitation light beam L1 (for example, a blue light) shown in FIG. 1 into a first excited light beam (for example, a green light) having a first wavelength, and the second wavelength conversion layer 126b is adapted to convert the excitation light beam L1 shown in FIG. 1 into a second excited light beam (for example, a yellow light) having a second wavelength, though the colors of the light beams are not limited thereto, where the first wavelength is different to the second wavelength, and the first wavelength and the second wavelength are all different to the wavelength of the excitation light beam L1. The excitation light beam L1 may also directly pass through the main body 122 via the light penetration region 122d of the main body 122. In this way, the excitation light beam L1 can be converted into various excited light beams in different colors after passing through the wavelength conversion layers of the wavelength conversion device 120.

Under the aforementioned configuration, the different sections 122a, 122b and 122c of the main body 122 are respectively configured with the first reflective layer 124a, the second reflective layer 124b and the third reflective layer 124c, where the first reflective layer 124a is aligned to the first wavelength conversion layer 126a, and the second reflective layer 124b and the third reflective layer 124c are aligned to the second wavelength conversion layer 126b. In this way, the first reflective layer 124a, the second reflective layer 124b and the third reflective layer 124c may respectively and selectively use different materials according to the corresponding wavelength conversion layers thereof, such that the wavelength conversion device 120 has a high reflectance for different color light beams, and it is unnecessary to adopt multilayer coating to make a single reflection layer to be adapted to reflect different color light beams, so as to save the manufacturing cost. In the embodiment, regarding the first excited light beam (for example, the green light) having the first wavelength, the first reflective layer 124a may provide a high reflectance for a green light waveband, and regarding the second excited light beam (for example, the yellow light) having the second wavelength, the second reflective layer 124b and the third reflective layer 124c may respectively provide a high reflectance for a yellow light waveband and a magenta light waveband, though the colors of the light beams and the corresponding high reflectance reflective layers of different wavebands are not limited thereto.

Figure 4:
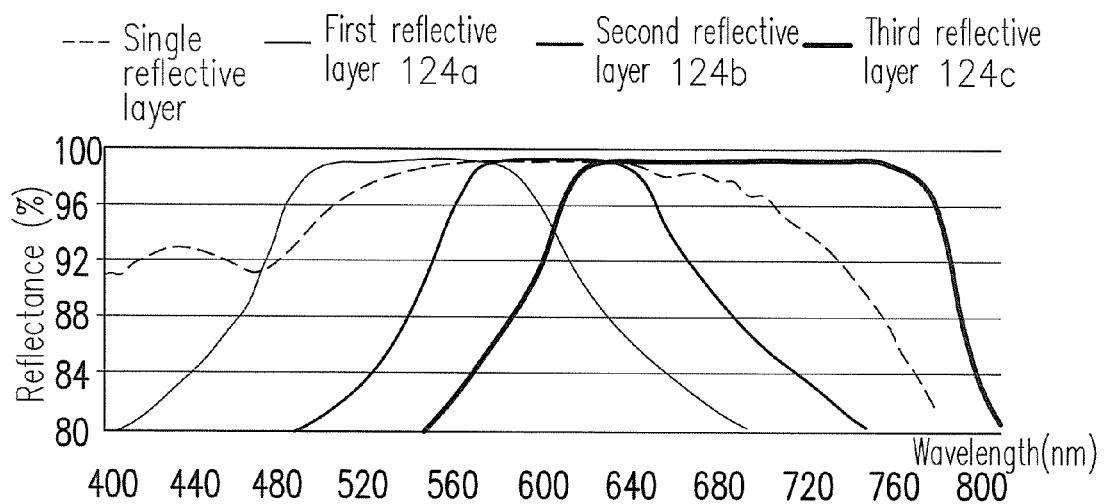
FIG. 4 illustrates relationship curves between reflectance of each reflective layer of FIG. 3 and wavelengths of different excited light beams.

FIG. 4 illustrates relationship curves between reflectance of each reflective layer of FIG. 3 and wavelengths of different excited light beams. For comparing, FIG. 4 also illustrates a relationship curve between reflectance of a single reflective layer of the conventional wavelength conversion device and wavelengths of different excited light beams. As shown in FIG. 4, the first reflective layer 124a, the second reflective layer 124b and the third reflective layer 124c aligned to the sections 122a, 122b and 122c of the main body 122 respectively provide a good reflectance for different wavelength sections, so that the wavelength conversion device of the embodiment may have a more comprehensive reflection capability compared to the conventional wavelength conversion device only configured with the single reflection layer, and has an enhanced overall brightness.

In other embodiments, the second wavelength conversion layer 126b can be replaced by two different wavelength conversion layers (not shown), and the two wavelength conversion layers are respectively aligned to the second reflective layer 124b and the third reflective layer 124c, and are respectively adapted to convert the excitation light beam L1 into excited light beams with different wavelengths (for example, a yellow light and a red light). Moreover, the number of the sections of the main body 122, the number of the reflective layers and the number of the wavelength conversion layers can be modified according to an actual design requirement, which is not limited by the invention. Configuration of the wavelength conversion device 120 of the embodiment is further described in detail below.

Referring to FIG. 3, in the embodiment, the main body 122 has a front surface S1 and a back surface S2 opposite to each other. The first reflective layer 124a, the second reflective layer 124b and the third reflective layer 124c are disposed adjacent to each other on the front surface S1 of the main body 122, and the first wavelength conversion layer 125a is disposed on the first reflective layer 124a, and the second wavelength conversion layer 126b is disposed on the second reflective layer 124b and the third reflective layer 124c, where the first reflective layer 124a is located between the front surface S1 of the main body 122 and the first wavelength conversion layer 126a. The second reflective layer 124b and the third reflective layer 124c is located between the front surface S1 of the main body 122 and the second wavelength conversion layer 126b.

The sections 122a, 122b and 122c of the main body 122 of the embodiment are, for example, formed integrally. Namely, the main body 122 of the wavelength conversion device 120 of the embodiment is a single disc-like substrate, and different reflective film materials are coated on the single disc-like substrate in sections to form the first reflective layer 124a, the second reflective layer 124b and the third reflective layer 124c. Moreover, a material of the main body 122 is a transparent non-metal material, such as ordinary glass, tempered glass, heat-resistant glass, quartz glass and sapphire glass, etc., with high surface flatness, such that the main body 122 has advantages of high reflectance, good chemical stability, good coating adhesion, etc.

Figure 5:
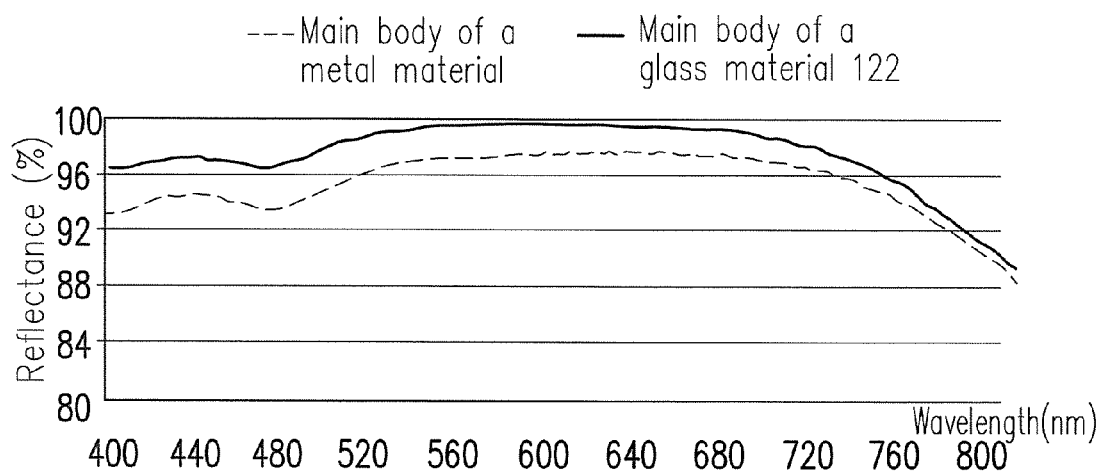
FIG. 5 illustrates a relationship curve between reflectance of the wavelength conversion device of FIG. 3 and wavelengths of different excited light beams.

FIG. 5 illustrates a relationship curve between reflectance of the wavelength conversion device of FIG. 3 and wavelengths of different excited light beams. For comparing, FIG. 5 also illustrates a relationship curve between reflectance of a main body made of a metal material of the conventional wavelength conversion device and wavelengths of different excited light beams. As shown in FIG. 5, compared to the conventional wavelength conversion device in which the main body is made of the metal material, and the metal main body is adopted to reflect light beam, the wavelength conversion device 120 of the embodiment, which adopts the main body 122 made of a glass material and uses different reflective layers corresponding to different wavelength sections (for example, the aforementioned first reflective layer 124a, the second reflective layer 124b and the third reflective layer 124c) to reflect light beam, has better reflectance.

Compared to the metal material with high thermal conductivity, the transparent non-metal material has a lower thermal conductivity, so that the heat produced by the excitation light beam L1 (shown in FIG. 1) irradiating on the main body 122 is not excessively conducted to the driving unit 128 connected to the main body 122, so as to avoid damaging or disabling the driving unit 128 due to overheat. However, the material of the main body 122 is not limited by the invention, which can be tempered glass, heat-resistant glass, quartz glass, ceramics, sapphire glass, graphite, a metal material, a composite material, a high (total) reflection material, a diffuse material or other suitable materials.

Referring to FIG. 3, the driving unit 128 of the embodiment is, for example, directly adhered to the back surface S2 of the main body 122 through an adhesive layer 129a. Moreover, the wavelength conversion device 120 further includes an assembly member 127, and the assembly member 127 is, for example, a metal ring and is adhered to the first reflective layer 124a, the second reflective layer 124b, the third reflective layer 124c and the light penetration region 122d on the first surface S1 of the main body 122 through an adhesive layer 129b, such that the main body 122 is stably clamped between the assembly member 127 and the driving unit 128.

Figure 6:
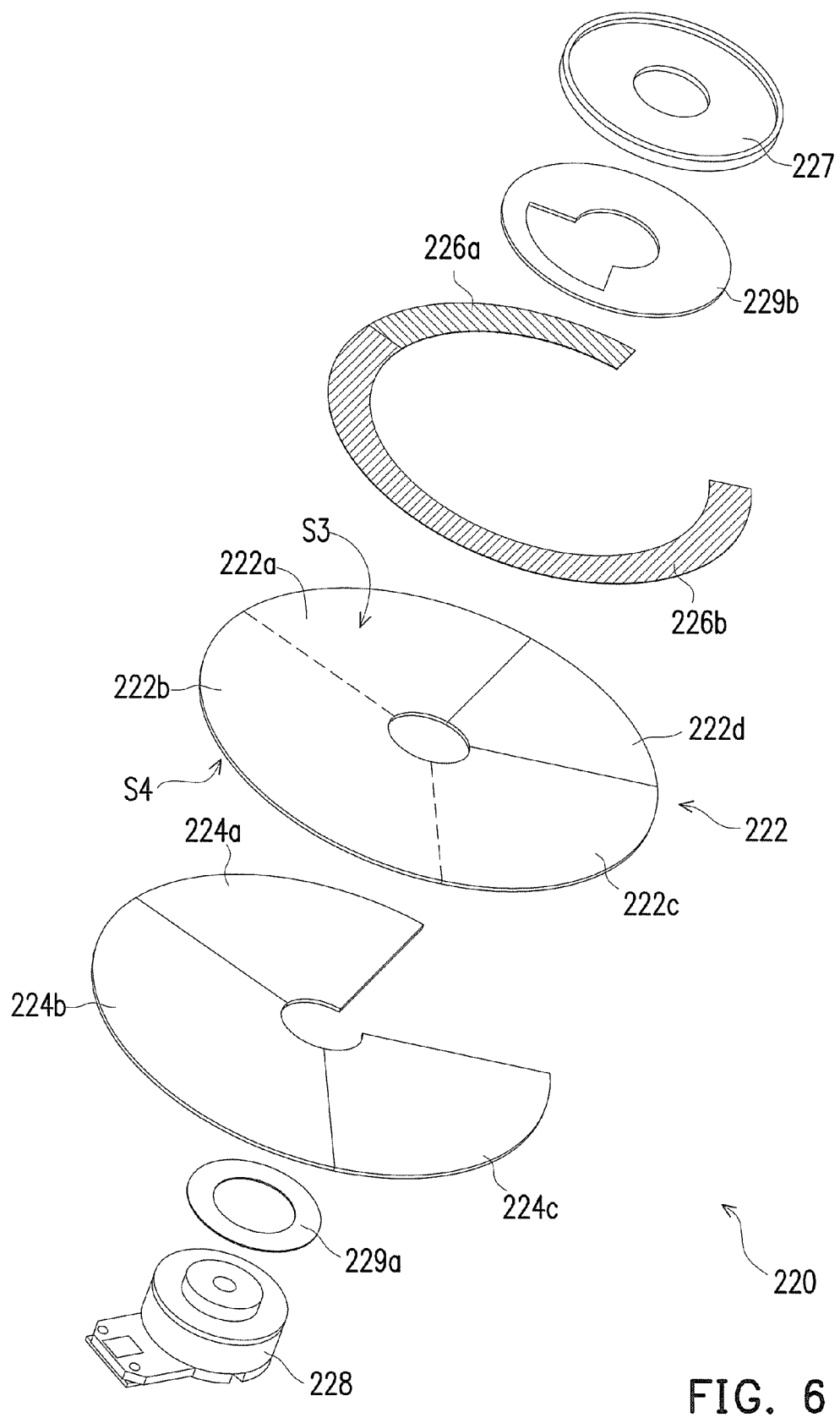
FIG. 6 is an exploded view of a wavelength conversion device according to another embodiment of the invention.

FIG. 6 is an exploded view of a wavelength conversion device according to another embodiment of the invention. In the wavelength conversion device 220 of FIG. 6, configurations and functions of a main body 222, a section 222a, a section 222b, a section 222c, a light penetration region 222d, a front surface S3, a back surface S4, a first reflective layer 224a, a second reflective layer 224b, a third reflective layer 224c, a first wavelength conversion layer 226a, a second wavelength conversion layer 226b, an assembly member 227, a driving unit 228, an adhesive layer 229a and an adhesive layer 229b are similar to that of the main body 122, the section 122a, the section 122b, the section 122c, the light penetration region 122d, the front surface S1, the back surface S2, the first reflective layer 124a, the second reflective layer 124b, the third reflective layer 124c, the first wavelength conversion layer 126a, the second wavelength conversion layer 126b, the assembly member 127, the driving unit 128, the adhesive layer 129a and the adhesive layer 129b of FIG. 3, and details thereof are not repeated.

A difference between the wavelength conversion device 220 and the wavelength conversion device 120 is that the first wavelength conversion layer 226a and the second wavelength conversion layer 226b are disposed on the front surface S3 of the main body 222, and the first reflective layer 224a, the second reflective layer 224b and the third reflective layer 224c are disposed adjacent to each other on the back surface S4 of the main body 222. The excitation light beam may first pass through the first wavelength conversion layer 226a or the second wavelength conversion layer 226b and is converted into an excited light beam, and then the excited light beam penetrates through the main body 222 made of the transparent material from the front surface S3 to reach the first reflective layer 224a, the second reflective layer 224b or the third reflective layer 224c located on the back surface S4 and is reflected by the same, and then the excited light beam penetrates through the main body 222 made of the transparent material from the back surface S4 to pass through the first wavelength conversion layer 226a or the second wavelength conversion layer 226b located on the front surface S3, and finally emits out from the wavelength conversion device 220.

Figure 7:
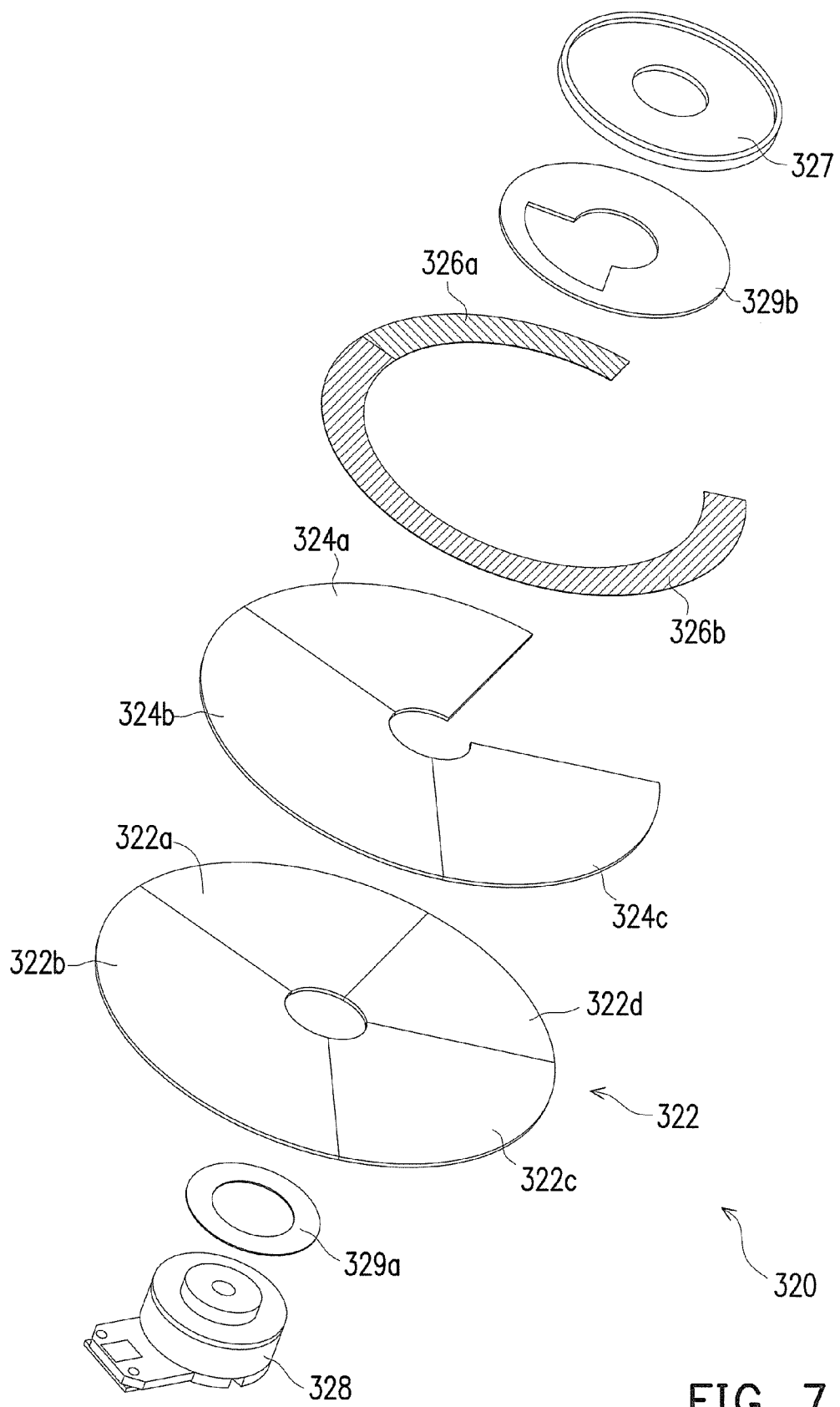
FIG. 7 is an exploded view of a wavelength conversion device according to another embodiment of the invention.

FIG. 7 is an exploded view of a wavelength conversion device according to another embodiment of the invention. In the wavelength conversion device 320 of FIG. 7, configurations and functions of a main body 322, a section 322a, a section 322b, a section 322c, a light penetration region 322d, a first reflective layer 324a, a second reflective layer 324b, a third reflective layer 324c, a first wavelength conversion layer 326a, a second wavelength conversion layer 326b, an assembly member 327, a driving unit 328, an adhesive layer 329a and an adhesive layer 329b are similar to that of the main body 122, the section 122a, the section 122b, the section 122c, the light penetration region 122d, the first reflective layer 124a, the second reflective layer 124b, the third reflective layer 124c, the first wavelength conversion layer 126a, the second wavelength conversion layer 126b, the assembly member 127, the driving unit 128, the adhesive layer 129a and the adhesive layer 129b of FIG. 3, and details thereof are not repeated.

A difference between the wavelength conversion device 320 and the wavelength conversion device 120 is that the sections 322a, 322b and 322c of the main body 322 are not integrally formed. To be specific, the sections 322a, 322b and 322c are, for example, a plurality of fan-shape plates. The fan-shape plates can be respectively coated with the first reflective layer 324a, the second reflective layer 324b and the third reflective layer 324c before mutual combination, and then the fan-shape plates coated with the first reflective layer 324a, the second reflective layer 324b and the third reflective layer 324c are adhered to the assembly member 327 together with the fan-shape light penetration region 322d through the adhesive layer 329b to form the disc-like main body 322. The first wavelength conversion layer 326a is disposed on the main body 322 and is aligned to the first reflective layer 324a, and the second wavelength conversion layer 326b is disposed on the main body 322 and is aligned to the second reflective layer 324b and the third reflective layer 324c, such that the first reflective layer 324a, the second reflective layer 324b, the third reflective layer 324c are located between the main body 322 and the first wavelength conversion layer 326a, the second wavelength conversion layer 326b. Under such configuration, the sections 322a, 322b and 322c of the main body 322 may respectively adopt different materials, such that each section can be configured with the corresponding reflective layer based on the material thereof to achieve higher reflectance. The material of each section of the main body 322 of the invention is not limited by the invention, which can be glass, tempered glass, heat-resistant glass, quartz glass, ceramics, sapphire glass, graphite, a metal material, a composite material, a high (total) reflection material, a diffuse material or other suitable materials.

Figure 8:
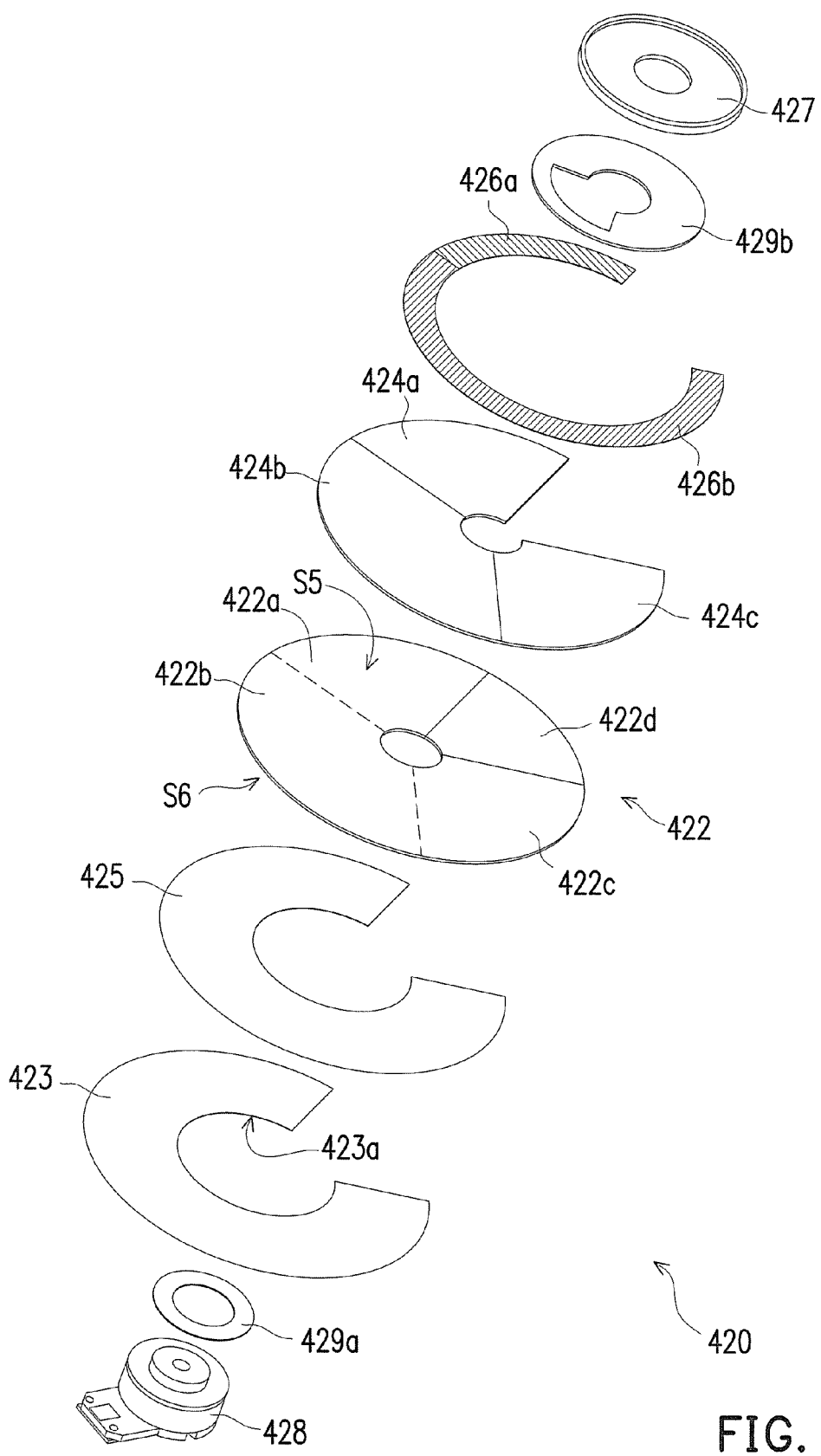
FIG. 8 is an exploded view of a wavelength conversion device according to another embodiment of the invention.

FIG. 8 is an exploded view of a wavelength conversion device according to another embodiment of the invention. In the wavelength conversion device 420 of FIG. 8, configurations and functions of a main body 422, a section 422a, a section 422b, a section 422c, a light penetration region 422d, a front surface S5, a back surface S6, a first reflective layer 424a, a second reflective layer 424b, a third reflective layer 424c, a first wavelength conversion layer 426a, a second wavelength conversion layer 426b, an assembly member 427, a driving unit 428, an adhesive layer 429a and an adhesive layer 429b are similar to that of the main body 122, the section 122a, the section 122b, the section 122c, the light penetration region 122d, the front surface S1, the back surface S2, the first reflective layer 124a, the second reflective layer 124b, the third reflective layer 124c, the first wavelength conversion layer 126a, the second wavelength conversion layer 126b, the assembly member 127, the driving unit 128, the adhesive layer 129a and the adhesive layer 129b of FIG. 3, and details thereof are not repeated.

A difference between the wavelength conversion device 420 and the wavelength conversion device 120 is that the wavelength conversion device 420 includes a heat-dissipation film 423, where the heat-dissipation film 423 is directly adhered to the back surface S6 of the main body 422 through a thermal conductive adhesive layer 425, and a position of the heat-dissipation film 423, for example, corresponds to positions of the first wavelength conversion layer 426a and the second wavelength conversion layer 426b. In this way, even if the material of the main body 422 is the transparent non-metal material (for example, glass) with poor heat dissipation capability, good heat dissipation efficiency can still be achieved through the configuration of the heat-dissipation film 423 and the thermal conductive adhesive layer 425, so as to avoid deterioration of the first wavelength conversion layer 426a and the second wavelength conversion layer 426b due to the excessively high temperature. Moreover, the heat-dissipation film 423 may have an opening 423a, and the driving unit 428 can be directly adhered to the back surface S6 of the main body 422 through the opening 423a by using the adhesive layer 429a, where the driving unit 428 does not directly contact the heat-dissipation film 423 and the thermal conductive adhesive layer 425, so as to avoid damaging or disabling the driving unit 428 due to overheat. In the embodiment, a material of the heat-dissipation film 423 is, for example, metal, graphite or other suitable materials with good thermal conductivity, which is not limited by the invention.

In summary, the embodiments of the invention have at least one of the following advantages or effects. In the wavelength conversion device of the invention, different sections of the main body are respectively configured with different reflective layers, and the reflective layers are respectively aligned to different wavelength conversion layers. In this way, the reflective layers may respectively and selectively use different materials according to the corresponding wavelength conversion layers, such that the wavelength conversion device has a high reflectance for the light beams in different colors, and it is unnecessary to adopt multilayer coating to make a single reflection layer to be adapted to reflect the light beams in different colors, so as to save the manufacturing cost. Moreover, the material of the main body of the wavelength conversion device can be a transparent non-metal material, for example, glass with a high flatness, such that the main body has advantages of high reflectance, good chemical stability, good coating adhesion, etc. Compared to the metal material with high thermal conductivity, the transparent non-metal material has a lower thermal conductivity, so that the heat produced by the excitation light beam irradiating on the main body is not excessively conducted to the driving unit connected to the main body, so as to avoid damaging or disabling the driving unit due to overheat. Moreover, the sections of the main body are or are not formed integrally, and if the sections of the main body are not formed integrally, the sections of the main body can be plates made of different materials, such that each section can be configured with the corresponding reflective layer based on the material thereof to achieve higher reflectance. Moreover, the heat-dissipation film can be configured to the main body of the wavelength conversion device to maintain good heat dissipation efficiency, so as to avoid deterioration of the wavelength conversion layers on the main body due to the excessively high temperature.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the disclosure is intended to be dedicated to the public regardless of whether the element or component is explicitly recited in the following claims.

What is claimed is:

1. A wavelength conversion device, adapted to convert a wavelength of an excitation light beam, the wavelength conversion device comprising:
a main body, having at least two sections;
a first reflective layer, disposed on the main body and aligned to one of the sections;
a second reflective layer, disposed on the main body and aligned to another one of the sections, wherein materials of the first reflective layer and the second reflective layer are different;
a first wavelength conversion layer, disposed on the main body and aligned to the first reflective layer, and the first wavelength conversion layer being adapted to convert the excitation light beam into a first excited light beam having a first wavelength; and a second wavelength conversion layer, disposed on the main body and aligned to the second reflective layer, and the second wavelength conversion layer being adapted to convert the excitation light beam into a second excited light beam having a second wavelength, wherein the first wavelength and the second wavelength are different, wherein the material of the one of the sections aligned to the first reflective layer is different from the material of the another one of the sections aligned to the second reflective layer.

2. The wavelength conversion device as claimed in claim 1, wherein the main body has a front surface, the first reflective layer and the second reflective layer are disposed on the front surface, the first wavelength conversion layer and the second wavelength conversion layer are respectively disposed on the first reflective layer and the second reflective layer, the first reflective layer is located between the front surface and the first wavelength conversion layer, and the second reflective layer is located between the front surface and the second wavelength conversion layer.

3. The wavelength conversion device as claimed in claim 1, wherein the main body has a front surface and a back surface opposite to each other, the first reflective layer and the second reflective layer are disposed on the back surface, and the first wavelength conversion layer and the second wavelength conversion layer are disposed on the front surface.

4. The wavelength conversion device as claimed in claim 1, wherein the sections of the main body are not formed integrally.

5. The wavelength conversion device as claimed in claim 1, wherein a material of the main body is a transparent non-metal material.

6. The wavelength conversion device as claimed in claim 1, further comprising a heat-dissipation film, wherein the main body has a front surface and a back surface opposite to each other, the first wavelength conversion layer and the second wavelength conversion layer are disposed on the front surface, and the heat-dissipation film is disposed on the back surface.

7. The wavelength conversion device as claimed in claim 6, further comprising a driving unit, wherein the driving unit is configured to drive the main body to rotate, and when the main body rotates, the main body drives the first wavelength conversion layer and the second wavelength conversion layer to sequentially move into a transmission path of the excitation light beam, the heat-dissipation film has an opening, and the driving unit is directly disposed on the back surface of the main body through the opening.

8. The wavelength conversion device as claimed in claim 1, wherein the main body has a light penetration region, and the light penetration region is located adjacent to the sections.

9. A projector, comprising:
an excitation light source device, adapted to provide an excitation light beam;
a wavelength conversion device, adapted to convert a wavelength of the excitation light beam, wherein the wavelength conversion device comprises:
a main body, having at least two sections;
a first reflective layer, disposed on the main body and aligned to one of the sections;
a second reflective layer, disposed on the main body and aligned to another one of the sections, wherein materials of the first reflective layer and the second reflective layer are different;
a first wavelength conversion layer, disposed on the main body and aligned to the first reflective layer, and the first wavelength conversion layer being adapted to convert the excitation light beam into a first excited light beam having a first wavelength; and
a second wavelength conversion layer, disposed on the main body and aligned to the second reflective layer, and the second wavelength conversion layer being adapted to convert the excitation light beam into a second excited light beam having a second wavelength, wherein the first wavelength and the second wavelength are different,
wherein the material of the one of the sections aligned to the first reflective layer is different from the material of the another one of the sections aligned to the second reflective layer;
a light valve, disposed on a transmission path of the excitation light beam, and adapted to convert the excitation light beam into an image light beam; and
a projection lens, located on a transmission path of the image light beam, and adapted to convert the image light beam into a projection light beam.

10. The projector as claimed in claim 9, wherein the main body has a front surface, the first reflective layer and the second reflective layer are disposed on the front surface, the first wavelength conversion layer and the second wavelength conversion layer are respectively disposed on the first reflective layer and the second reflective layer, the first reflective layer is located between the front surface and the first wavelength conversion layer, and the second reflective layer is located between the front surface and the second wavelength conversion layer.

11. The projector as claimed in claim 9, wherein the main body has a front surface and a back surface opposite to each other, the first reflective layer and the second reflective layer are disposed on the back surface, and the first wavelength conversion layer and the second wavelength conversion layer are disposed on the front surface.

12. The projector as claimed in claim 9, wherein the sections of the main body are not formed integrally.

13. The projector as claimed in claim 9, wherein a material of the main body is a transparent non-metal material.

14. The projector as claimed in claim 9, wherein the wavelength conversion device comprises a heat-dissipation film, the main body has a front surface and a back surface opposite to each other, the first wavelength conversion layer and the second wavelength conversion layer are disposed on the front surface, and the heat-dissipation film is disposed on the back surface.

15. The projector as claimed in claim 14, wherein the wavelength conversion device comprises a driving unit, the driving unit is configured to drive the main body to rotate, and when the main body rotates, the main body drives the first wavelength conversion layer and the second wavelength conversion layer to sequentially move to the transmission path of the excitation light beam, the heat-dissipation film has an opening, and the driving unit is directly disposed on the back surface of the main body through the opening.

16. The projector as claimed in claim 9, wherein the main body has a light penetration region, and the light penetration region is located adjacent to the sections.

* * * * *